US009787337B2

(12) United States Patent
Caretti et al.

(10) Patent No.: US 9,787,337 B2
(45) Date of Patent: Oct. 10, 2017

(54) RECEIVER FOR WIRELESS COMMUNICATIONS NETWORKS

(71) Applicants: TELECOM ITALIA S.P.A., Milan (IT); POLITECNICO DI TORINO, Turin (IT)

(72) Inventors: Marco Caretti, Turin (IT); Ivano Collotta, Turin (IT); Bruno Melis, Turin (IT); Marina Mondin, Turin (IT)

(73) Assignees: Telecom Italia S.p.A., Milan (IT); Politecnico di Torino, Turin (IT)

( * ) Notice: Subject to any disclaimer, the term of this patent is extended or adjusted under 35 U.S.C. 154(b) by 0 days.

(21) Appl. No.: 15/109,358

(22) PCT Filed: Dec. 30, 2013

(86) PCT No.: PCT/EP2013/078122
§ 371 (c)(1),
(2) Date: Jun. 30, 2016

(87) PCT Pub. No.: WO2015/101384
PCT Pub. Date: Jul. 9, 2015

(65) Prior Publication Data
US 2016/0329919 A1 Nov. 10, 2016

(51) Int. Cl.
*H04B 1/10* (2006.01)
*H04L 1/06* (2006.01)
(Continued)

(52) U.S. Cl.
CPC .............. *H04B 1/10* (2013.01); *H04L 1/005* (2013.01); *H04L 1/0051* (2013.01); (Continued)

(58) Field of Classification Search
CPC ..... H04L 1/005; H04L 1/0048; H04L 1/0054; H04L 2025/03426; H04L 25/03821; (Continued)

(56) References Cited

U.S. PATENT DOCUMENTS

2003/0103584 A1* 6/2003 Bjerke .................. H04L 1/0003
375/340
2005/0190868 A1 9/2005 Khandekar et al.
(Continued)

FOREIGN PATENT DOCUMENTS

WO 2008/069467 A1 6/2008

OTHER PUBLICATIONS

Jun. 2, 2014—(WO) International Search Report—App PCT/EP2013/078122.
(Continued)

*Primary Examiner* — Duc M Nguyen
(74) *Attorney, Agent, or Firm* — Banner & Witcoff, Ltd.

(57) ABSTRACT

An iterative receiver is proposed for receiving in a cell a signal and for providing information carried on the signal by execution of at least one processing iteration. The receiver includes an estimate assembly for receiving the signal and providing, at each one of the processing iterations, a respective information estimate; a regeneration assembly for receiving, at each processing iteration, the information estimate provided by the estimate assembly at that iteration, and for providing a regenerated signal therefrom based on the information estimate and on attenuation of radio channels over which the signal has been transmitted; an interference estimate unit for providing, at each iteration, an interference estimate based on the signal and the regenerated signal, the estimate assembly providing, starting from a second processing iteration of the processing iterations, the information estimate based on the interference estimate; and an extraction unit for extracting the information from the information estimate.

20 Claims, 4 Drawing Sheets

Figure 1:
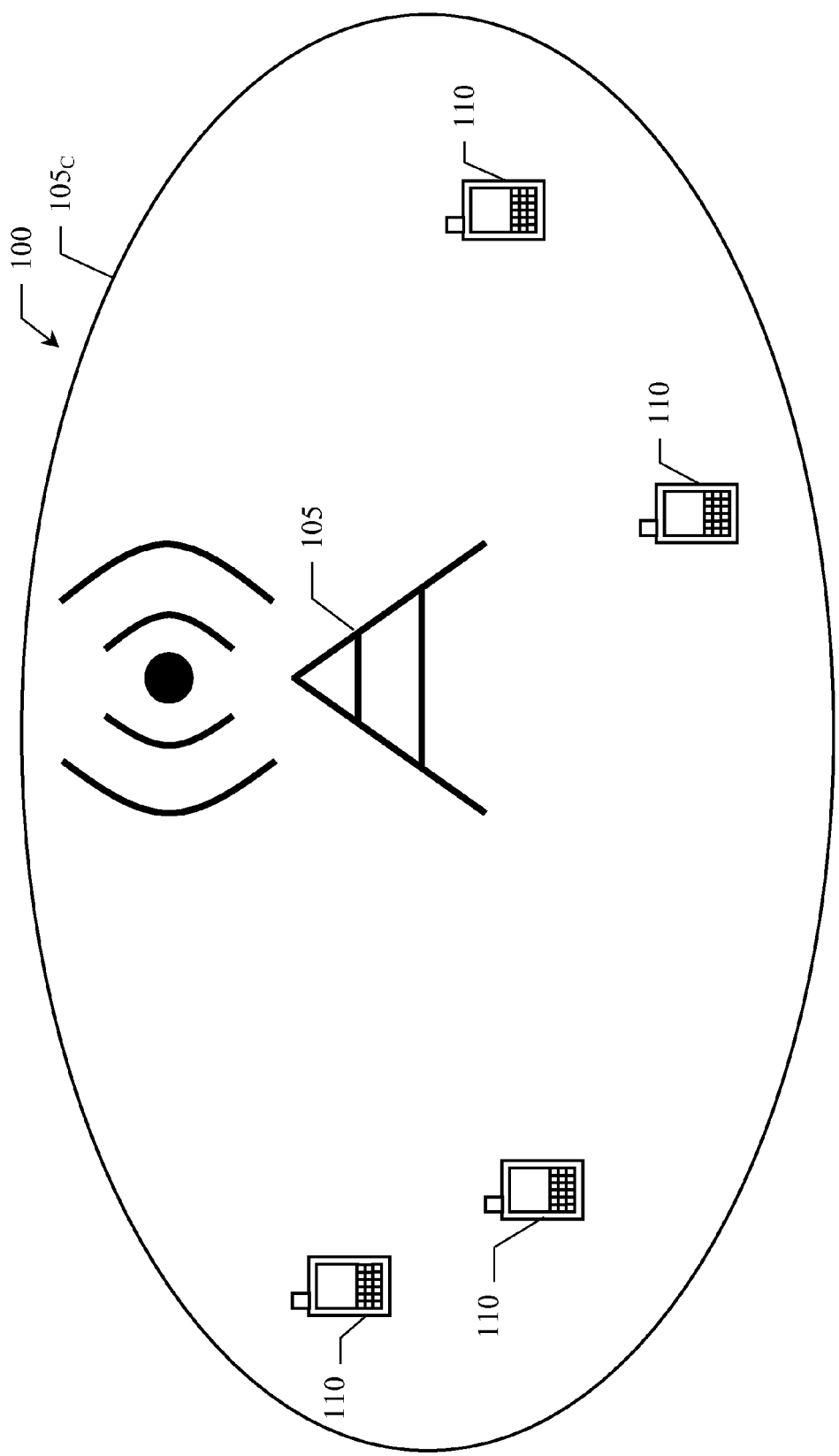

(51) Int. Cl.
*H04B 1/7107* (2011.01)
*H04L 1/00* (2006.01)

(52) U.S. Cl.
CPC .......... *H04L 1/0067* (2013.01); *H04L 1/0643* (2013.01); *H04B 1/7107* (2013.01); *H04L 1/0009* (2013.01); *H04L 1/0061* (2013.01)

(58) Field of Classification Search
CPC ............ H04L 25/03006; H04B 1/7097; H04B 1/7107; H04B 2201/709727; H04B 2201/709763
See application file for complete search history.

(56) References Cited

U.S. PATENT DOCUMENTS

| | | | |
|---|---|---|---|
| 2006/0269022 A1 | 11/2006 | Li et al. | |
| 2007/0162827 A1* | 7/2007 | Walton ...................... | H04L 1/06 714/774 |
| 2009/0304125 A1* | 12/2009 | Kim ...................... | H04L 1/0048 375/341 |
| 2010/0034110 A1* | 2/2010 | Kim ................... | H04B 1/71075 370/252 |
| 2010/0238981 A1* | 9/2010 | Nagarajan ............ | H04B 1/7107 375/148 |
| 2010/0266069 A1* | 10/2010 | Nam .................. | H03M 13/2957 375/340 |
| 2011/0051858 A1* | 3/2011 | Salvekar .............. | H04B 1/7107 375/341 |
| 2011/0051860 A1* | 3/2011 | Tang ...................... | H04L 1/005 375/341 |
| 2011/0158359 A1 | 6/2011 | Khayrallah et al. | |
| 2012/0027138 A1* | 2/2012 | Nagarajan ............ | H04B 1/7107 375/346 |
| 2013/0163704 A1* | 6/2013 | Liu ................... | H04L 25/03006 375/346 |
| 2014/0314188 A1* | 10/2014 | Nagarajan ............ | H04B 1/7107 375/346 |
| 2016/0142180 A1* | 5/2016 | Caretti ................. | H04B 7/0413 375/267 |

OTHER PUBLICATIONS

Ming Zhao et al: "An Iterative Receiver with Channel Estimation for MIMO-OFDM Over a Time and Frequency Dispersive Fading Channel", Global Telecommunications Conference, 2007, GLOBECOM '07, IEEE, IEEE, Piscataway. NJ. USA Nov. 1, 2007 (Nov. 1, 2007), pp. 4155-4159, XP031196718.

Jun. 30, 2016—(WO) Written Opinion of the ISA—App PCT/EP2013/078122.

S. M. Alamouti, "A Simple Transmit Diversity Technique for Wireless Communications", IEEE Journal on Select Areas in Communications, vol. 16, No. 8, Oct. 1998.

Y. Ohwatari, et al, "Investigation on Advanced Receiver Employing Interference Rejection Combining for Space-Frequency Block Code Transmit Diversity in LTE-Advanced Downlink", 2012 IEEE 23rd International Symposium on Personal, Indoor and Mobile Radio Communications—(PIMRC) [See Specification for Relevance].

S.T. Brink et Al., "Iterative Demapping and Decoding for Multilevel Modulations", IEEE 1998 [See Specification For Relevance].

Y. Ohwatari, et al, "Investigation on Advanced Receiver Employing Interference Rejection Combining for Space-Frequency Block Code Transmit Diversity in LTE-Advanced Downlink", 2012 IEEE 23rd International Symposium on Personal, Indoor and Mobile Radio Communications—(PIMRC).

S.T. Brink et Al., "Iterative Demapping and Decoding for Multilevel Modulations", IEEE 1998.

\* cited by examiner

RECEIVER FOR WIRELESS COMMUNICATIONS NETWORKS

BACKGROUND OF THE INVENTION

Field of the Invention

The solution according to one or more embodiments of the invention generally relates to wireless communication networks. More particularly, the proposed solution relates to an advanced receiver architecture applicable in wireless communication networks based on OFDM ("Orthogonal Frequency Division Multiplexing") and MIMO ("Multiple Input Multiple Output") techniques—such as LTE ("Long Term Evolution"), LTE-Advanced and WiMAX ("Worldwide Interoperability for Microwave Access") networks.

Overview of the Related Art

Evolution of wireless communications has experienced significant growth in terms of spread and performance, and has recently brought to 3GPP LTE ("Third Generation Partnership Project Long Term Evolution")/LTE-Advanced and WiMAX standards.

Such standards are conceived for allowing high-speed transmissions.

In order to achieve that, a combination of OFDM and MIMO techniques is used for transmission. According to OFDM technique, bits to be transmitted are split into bits sequences, then the bits sequences are modulated by separate and reciprocally orthogonal sub-carriers and multiplexed into OFDM symbols for transmission. According to MIMO technique, multiple OFDM symbols are transmitted/received via multiple transmitting/receiving antennas.

As known, spectral efficiency of modern wireless communication networks is severely limited by inter-cell interference (i.e., the interference originated by adjacent cells on the cell which a serving transmitter belongs to), especially for users located at cell edges. For this reason, modern wireless communication networks provide, before transmission, OFDM symbols encoding that exploits the availability of multiple transmitting/receiving antennas, such as SFBC ("Space Frequency Block Code") or STBC ("Space Time Block code") encoding (based on the application of the Alamouti algorithm in the frequency or time domains, respectively) in case of two transmitting antennas, or SFBC-FSTD ("SFBC-Frequency Switching Transmit Diversity") encoding in case of four transmitting antennas.

SFBC/STBC-based or SFBC-FSTD-based MIMO OFDM techniques require additional computational capabilities in order to correctly decode, at user terminal side, the transmitted bits.

This is exacerbated in modern scenarios, wherein the growing number of wireless communication networks users, as well as the growing demand for services requiring very high data traffic (such as internet, multimedia and real-time services) and the evolution of mobile applications, require higher and higher user data rates.

In the state of the art, different algorithms (and/or receiver architectures implementing them) intended to improve decoding of the transmitted bits are proposed.

S. M. Alamouti, "*A Simple Transmit Diversity Technique for Wireless Communications*", IEEE Journal on Select Areas in Communications, vol. 16, no. 8, October 1998, describes the principles of the space/time algorithm devised by Alamouti.

Y. Ohwatari, et al, "*Investigation on Advanced Receiver Employing Interference Rejection Combining for Space-Frequency Block Code Transmit Diversity in LTE-Advanced Downlink*", 2012 IEEE 23rd International Symposium on Personal, Indoor and Mobile Radio Communications—(PIMRC), discloses the application of the MMSE-IRC algorithm for the specific case of SFBC transmission in the LTE/LTE-Advanced system. The MMSE-IRC algorithm provides superior performance compared to the Alamouti algorithm in the presence of colored (i.e. correlated) interference. Besides, the paper provides a method for the estimate of the spatial correlation matrix of the interference based on Reference Signals (RS) provided in LTE/LTE-Advanced system.

WO 2008/069467 discloses an iterative receiver comprising a signal detector estimating interference from an estimated transmitted signal, and canceling the estimated interference from a signal received through an antenna; a decoder performing channel decoding by using the interference cancelled received signal; a soft decision unit performing a soft decision process on the transmitted signal by using the channel decoded signal; a channel estimator estimating a channel by using the soft decision applied transmitted signal and the received signal; a covariance estimator estimating covariance on the sum signal of the interference and noise by using the soft decision applied transmitted signal, the received signal, and the estimated channel; and a hard decision unit determining the transmitted signal by using the channel decoded signal after interference cancellation, channel decoding, estimated transmitted signal updating, channel estimation, and covariance estimation are iterated a number of times.

S. T. Brink et Al., "*Iterative Demapping and Decoding for Multilevel Modulations*", IEEE 1998, discloses the architecture of an iterative receiver wherein symbol-to-bit demapping and channel decoding operations are executed iteratively.

SUMMARY OF INVENTION

The Applicant has recognized that none of the cited prior art solutions is satisfactory.

Indeed, the Applicant has found that the Alamouti algorithm proposed in the paper "*A Simple Transmit Diversity Technique for Wireless Communications*" is optimal only in the presence of spatially uncorrelated (i.e., white) Gaussian noise and/or interference; that the MMSE-IRC algorithm proposed in the paper "*Investigation on Advanced Receiver Employing Interference Rejection Combining for Space-Frequency Block Code Transmit Diversity in LTE-Advanced Downlink*" is sub-optimal in presence of inter-cell interference; that the architecture of the iterative receiver proposed in WO 2008/069467 provides interference cancellation only in case of reception of multiple data streams (i.e., spatial multiplexing transmission); and that the architecture of the iterative receiver proposed in the paper "*Iterative Demapping and Decoding for Multilevel Modulations*" is limited to single-antenna systems (i.e., SISO, "Single Input Single Output").

Moreover, the architectures of the iterative receivers proposed in WO2008/069467 and in the paper "*Iterative Demapping and Decoding for Multilevel Modulations*" are based on a trade-off, not compatible with nowadays performance requirements, between user throughput and implementation complexity.

In view of the above, the Applicant has tackled the problem of providing fast and correct decoding of the transmitted bits in SFBC/STBC-based or SFBC-FSTD-based MIMO OFDM systems, and, in order to achieve that, has devised a simple (i.e., low implementation complexity) and effective (i.e., high user throughput) receiver architecture.

One or more aspects of the solution according to embodiments of the invention are set out in the independent claims, with advantageous features of the same solution that are indicated in the dependent claims, whose wording is enclosed herein verbatim by reference (with any advantageous feature being provided with reference to a specific aspect of the solution according to an embodiment of the invention that applies mutatis mutandis to any other aspect).

More specifically, one aspect of the solution according to embodiments of the invention relates to an iterative receiver for receiving in a cell a signal and for providing information carried on said signal by execution of at least one processing iteration. The receiver comprises: an estimate assembly for receiving the signal and providing, at each one of said processing iterations, a respective information estimate; a regeneration assembly for receiving, at each processing iteration, said information estimate provided by the estimate assembly at that iteration, and for providing a regenerated signal therefrom based on said information estimate and on attenuation of radio channels over which the signal has been transmitted; an interference estimate unit for providing, at each iteration, an interference estimate based on the signal and the regenerated signal, the estimate assembly providing, starting from a second processing iteration of said processing iterations, said information estimate based on said interference estimate; and an extraction unit for extracting said information from said information estimate.

According to an embodiment of the invention, the estimate assembly comprises a decoding unit for decoding said signal into a decoded signal, said decoding unit being based, from said second iteration, on "Minimum Mean Square Error" or "Minimum Mean Square Error-Interference Rejection Combining" decoding algorithms. Said interference estimate comprises a spatial correlation matrix or a power of interference-plus-noise signals affecting said signal, respectively.

According to an embodiment of the invention, the estimate assembly further comprises a soft-demodulation unit for receiving said decoded signal and providing demodulated data, and the regenerating assembly comprises a rate-matching unit for receiving, at each processing iteration, said information estimate provided by the estimation assembly at that iteration and providing corresponding rate-matched data. From the third iteration, the soft-demodulation unit is configured for further receiving said rate-matched data and for providing said soft-demodulated data also based on said rate-matched data.

According to an embodiment of the invention, the estimate assembly further comprises a subtraction node for subtracting the rate-matched data from the demodulated data thereby obtaining combined demodulated data, a rate de-matching unit for receiving the combined demodulated data and providing rate de-matched data, and a further decoder unit for receiving the rate de-matched data and providing said information estimate.

According to an embodiment of the invention, said estimate unit is based, at the first iteration, on "Minimum Mean Square Error" or "Minimum Mean Square Error-Interference Rejection Combining" decoding algorithms, the estimate assembly providing, at the first iteration, said information estimate based on a further interference estimate based only on said signal.

According to an embodiment of the invention, said estimation unit is based, at the first iteration, on Alamouti algorithm.

According to an embodiment of the invention, the number of iterations is set dynamically depending on operative parameters indicative of inter-cell interference.

According to an embodiment of the invention, said operative parameters comprise a "Channel Quality Indicator".

According to an embodiment of the invention, the number of iterations is set dynamically depending on a "Cyclic Redundancy Code" associated with said information.

According to an embodiment of the invention, the interference estimate unit comprises a regeneration assembly for receiving the rate matched data and providing a regenerated decoded signal, and multiplying nodes for providing the regenerated signal by multiplying the regenerated decoded signal by channel coefficients estimating the attenuation of radio channels over which the signal has been transmitted.

According to an embodiment of the invention, the regeneration assembly comprises hard decision, modulation and SFBC encoding units.

According to an embodiment of the invention, the regeneration assembly comprises soft-modulation and SFBC encoding units.

Another aspect of the solution according to embodiments of the invention relates to a user equipment comprising said receiver.

A further aspect of the solution according to embodiments of the invention relates to a method for providing information carried on a signal received in a cell. The method comprises: receiving the signal and providing, at each one of a number of processing iterations, a respective information estimate; receiving, at each processing iteration, said information estimate provided by the estimate assembly at that iteration, and providing a regenerated signal therefrom based on said information estimate and on attenuation of radio channels over which the signal has been transmitted; providing, at each iteration, an interference estimate based on the signal and the regenerated signal, the estimate assembly providing, starting from a second processing iteration of said processing iterations, said information estimate based on said interference estimate; and extracting said information from said information estimate.

Thanks to the proposed receiver, fast and correct decoding of the transmitted bits in SFBC/STBC-based or SFBC-FSTD-based MIMO OFDM systems is achieved, while providing low implementation complexity and increased user throughput.

BRIEF DESCRIPTION OF THE ANNEXED DRAWINGS

Figure 2:
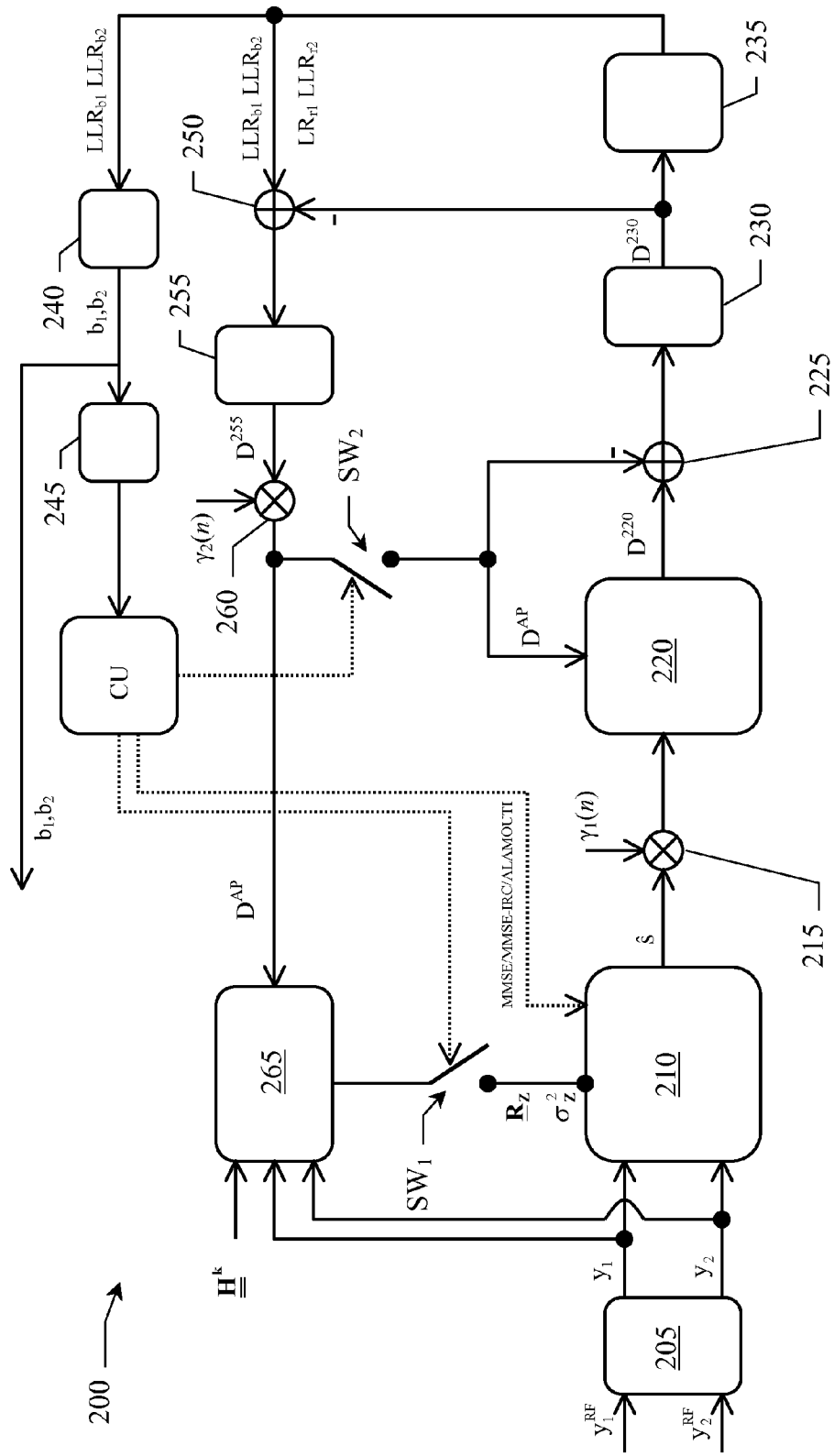
Figure 3A:
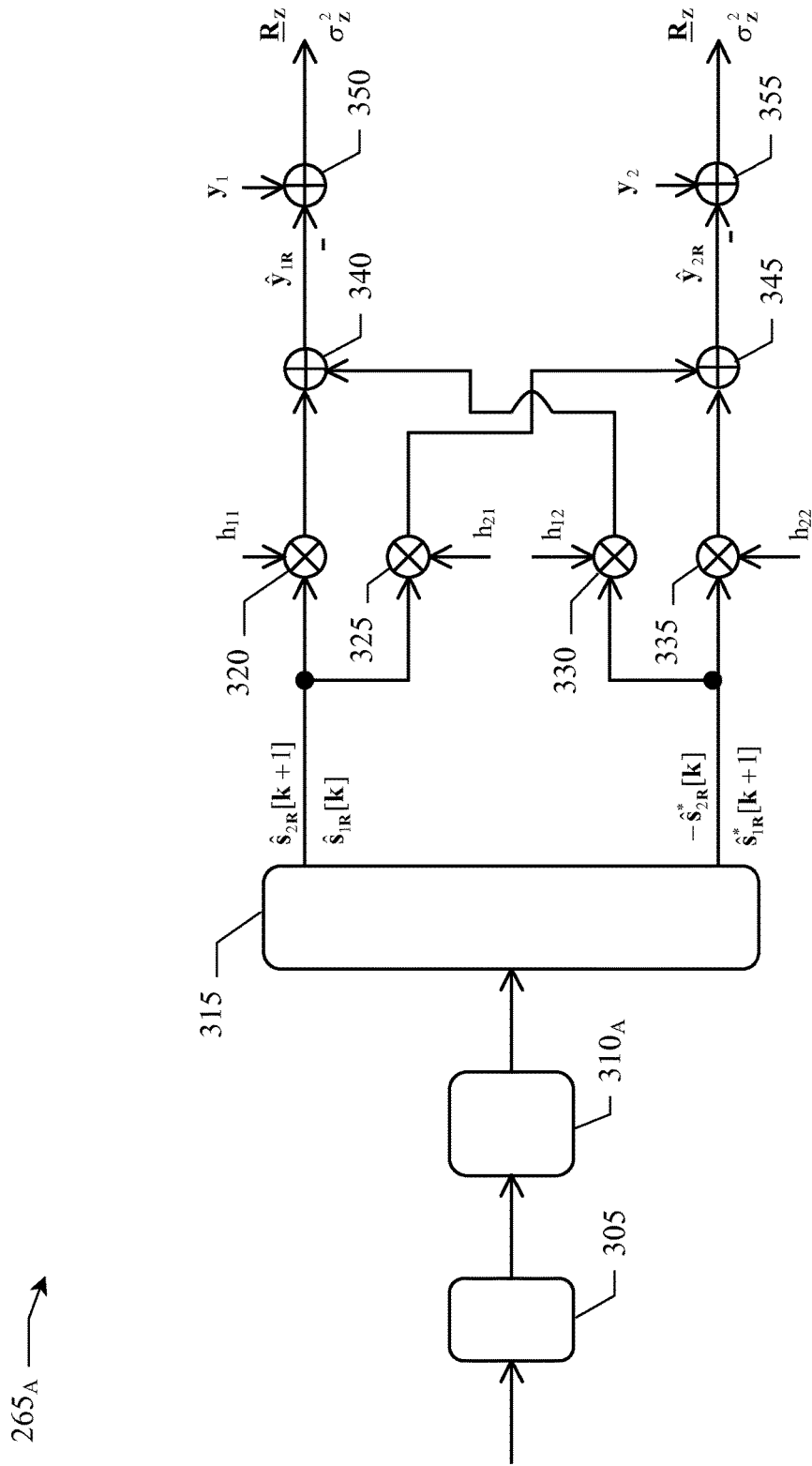
Figure 3B:
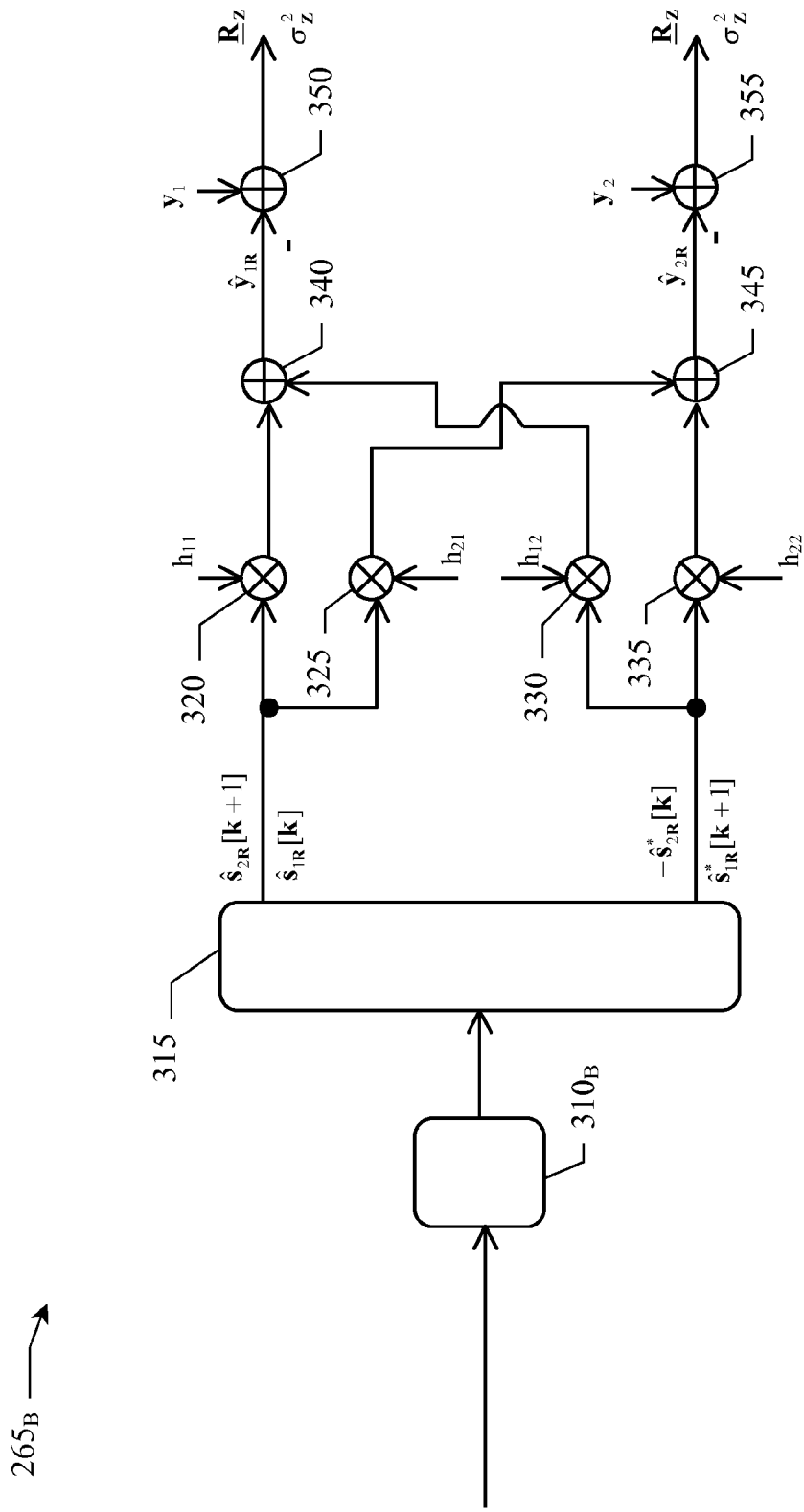

These and other features and advantages of the present invention will be made apparent by the following description of some exemplary and non limitative embodiments thereof. For its better intelligibility, the following description should be read making reference to the attached drawings, wherein:

FIG. 1 schematically shows a wireless communications network wherein the solution according to one or more embodiments of the invention can be applied;

FIG. 2 schematically shows a receiver architecture according to an embodiment of the invention, and FIGS. 3A and 3B schematically show a portion of the receiver architecture according to respective embodiments of the invention.

DETAILED DESCRIPTION OF PREFERRED EMBODIMENTS OF THE INVENTION

With reference to the drawings, a wireless communications network 100 wherein the solution according to one or more embodiments of the present invention can be applied is schematically illustrated in FIG. 1. The wireless communications network 100 comprises a plurality (only one depicted in the figure) of transceiver stations (or nodes) 105. Each node 105 is configured to provide radio coverage over a geographic area, also referred to as cell 105$_C$, for allowing User Equipments (UEs) 110 (e.g., mobile phones) within the cell 105$_C$ to exchange Radio Frequency (RF) signals enabling data traffic services (e.g., web browsing, e-mailing, voice, and/or multimedia services).

In order to achieve that, both the node 105 and the UEs 110 within the cell 105$_C$ comprise respective transmitting/receiving antennas (not shown) for mutual exchange of the RF signals, and suitable processing circuitry (not shown) for properly processing them.

Broadly speaking, processing circuitry at UE 110 side typically comprises a receiver for converting the received RF signals into corresponding base-band signals and processing them for information extraction, and a transmitter for processing and base-band/RF converting signals to be transmitted via the respective transmitting antenna/antennas.

The wireless communications network 100 is for example compliant with the 3GPP LTE/LTE-Advanced or WiMAX standards, however the principles of the invention generally apply to any wireless communication network based on OFDM ("Orthogonal Frequency Division Multiplexing") and MIMO ("Multiple Input Multiple Output") techniques, and on SFBC ("Space Frequency Block Code")/STBC ("Space Time Block code") or SFBC-FSTD ("SFBC-Frequency Switching Transmit Diversity") encoding.

According to OFDM technique, bits to be transmitted (including both information bits and control bits, such as redundancy bits) are split into bits sequences, thereafter the bits sequences are modulated by separate and reciprocally orthogonal sub-carriers and multiplexed into OFDM symbols for transmission. According to MIMO technique, OFDM symbols are transmitted/received via multiple transmitting/receiving antennas at both node 105 and UE 110 sides, which improves communication performance without additional bandwidth or increased transmission power.

As known, OFDM technique is based on radio resources allocation in time/frequency domain. Considering for example the 3GPP LTE/LTE-Advanced standard, in time domain radio resources are distributed every Transmission Time Interval (TTI), each one lasting 1 ms (sub-frame) and comprising two time slots of 0.5 ms each, whereas in frequency domain the whole bandwidth is divided into a plurality of 180-kHz sub-channels (each one corresponding to N=12 adjacent and equally spaced sub-carriers). A radio resource comprising a certain number of OFDM symbols (e.g., seven) spanning over one time slot in time domain and twelve adjacent sub-carriers in frequency domain is referred to as PRB ("Physical Resource Block"), and corresponds to the smallest radio resource that can be allocated to a UE 110 for transmission. Each PRB comprises twelve sub-carriers spaced in frequency by 15 kHz over one OFDM symbol (each sub-carrier is referred to as "Resource Element", or RE)—the total number of sub-carriers is therefore 12*7=84 REs for each PRB.

In the scenario herein considered OFDM symbols are encoded, before transmission thereof, by exploiting the availability of multiple transmitting/receiving antennas. For example, OFDM symbols encoding can be achieved by SFBC ("Space Frequency Block Code") or STBC ("Space Time Block code") encoding (based on the application of the Alamouti algorithm in the frequency or time domains, respectively) in case of two transmitting antennas, or SFBC-FSTD ("SFBC-Frequency Switching Transmit Diversity") encoding in case of four transmitting antennas.

According to the invention, the UE 110 is provided with an advanced receiver (e.g., an iterative receiver), whose architecture according to an embodiment is schematically shown in FIG. 2 and denoted by the number reference 200. For the sake of conciseness, only a part of the receiver 200 relevant for understanding the invention has been illustrated and will be discussed herebelow, with the other, well known parts of the receiver 200 that have been intentionally omitted or simplified.

Basically, the receiver 200 features a loop architecture that, by means of one or more (e.g., multiple) processing iterations (or iterations), allows correct decoding/extraction of the information bits. In order to achieve that, as progressively detailed when disclosing the receiver 200 architecture, first $SW_1$ and second $SW_2$ switching elements are provided whose activation (e.g., closing) or deactivation (e.g., opening), properly controlled by a control unit CU, enables or disables, at selected iterations, corresponding operative branches, and hence loops, of the receiver 200.

In the exemplary disclosed embodiment, a 2×2 MIMO system will be considered, with i=1,2 receiving antennas (not shown) at UE 110 side (hereinafter, also referred to as first and second receiving antennas) and j=1,2 transmitting antennas (not shown) at node 105 side, and SFBC encoding will be assumed by way of example only.

According to SFBC encoding, Alamouti algorithm is applied in the frequency domain over two adjacent OFDM sub-carriers (two transmitting antennas). However, in case of a higher number of transmitting antennas, different encoding may exploited—e.g., the SFBC-FSTD encoding in case of four transmitting antennas.

In such a scenario the RF signal $\underline{y}^{RF}$ received at the UE 110 side can be expressed as $$y_1^{RF}[k]=h_{11}[k]s_1-h_{12}[k]s_2^*+n_{1'}[k]$$

$$y_2^{RF}[k]=h_{21}[k]s_1-h_{22}[k]s_2^*+n_{2'}[k]$$

$$y_1^{RF}[k+1]=h_{11}[k+1]s_2+h_{12}[k+1]s_1^*+n_1[k+1]$$

$$y_2^{RF}[k+1]=h_{21}[k+1]s_2+h_{22}[k+1]s_1^*+n_2[k+1]$$

wherein:

$y_1^{RF}[k]$ $y_1^{RF}[k+1]$ are the RF signals received by the first receiving antenna on the k-th and (k+1)-th OFDM sub-carriers, respectively, and $y_2^{RF}[k]$ and $y_2^{RF}[k+1]$ are the RF signals received by the second receiving antenna on the k-th and (k+1)-th OFDM sub-carriers, respectively, $h_{ij}[k]$ and $h_{ij}[k+1]$ are the channel coefficients (i.e., the coefficients indicative of the attenuation of the radio channels over which the RF signal $\underline{y}^{RF}$ has been propagated) between the i-th receiving antenna and the j-th transmitting antenna on the k-th and (k+1)-th OFDM sub-carriers, respectively, $n_1[k]$ and $n_1[k+1]$ are interference-plus-noise signals received by the first receiving antenna on the k-th and (k+1)-th OFDM sub-carriers, respectively, and $n_2[k]$ and $n_2[k+1]$ are interference-plus-noise signals received by the second receiving antenna on the k-th and (k+1)-th OFDM sub-carriers, respectively, and $s_i$ are QAM ("Quadrature Amplitude Modulation")—modulated symbols coming from layer mapping block (not shown), the superscript (.)* denoting the conjugate mathematical operation.

Although the receiver 200 has been exemplary assumed as being located at UE 110 side, this should not construed limitatively. Indeed, additionally or alternatively, the receiver 200 (or a part thereof) may be located at node 105 side, so as to apply the principles of the invention to uplink transmission between the UE 110 (which thus acts as serving transmitter equipment) and the node 105.

Back to FIG. 2, the receiver 200 comprises a RF/IF unit 205 for receiving the RF signal $\underline{y}^{RF}$, and, upon proper processing thereof (e.g., RF filtering, frequency IF downconversion, A/D conversion, digital filtering and decimation, cyclic prefix removal and FFT operation) providing the corresponding base-band signal (hereinafter, SFBC signal) $\underline{y}=[y_1,y_2]^T$ in the frequency domain, comprising the OFDM symbols mapped on the k-th OFDM sub-carriers, as given by the following equation (the sub-carrier k and antenna i,j indexes being omitted for the sake of ease):

$$\underline{y} = \underline{H}_0 \underline{s} + \sum_{q=1}^{Q} \underline{H}_q \underline{s}_q + \underline{n}$$

$$\underline{y} = \begin{bmatrix} y_1[k] \\ y_2[k] \\ y_1^*[k+1] \\ y_2^*[k+1] \end{bmatrix}$$

$$\underline{H}_0 = \begin{bmatrix} h_{11}[k] & h_{12}[k] \\ h_{21}[k] & h_{22}[k] \\ h_{12}^*[k+1] & -h_{11}^*[k+1] \\ h_{22}^*[k+1] & -h_{21}^*[k+1] \end{bmatrix}$$

$$\underline{s} = \begin{bmatrix} s_1 \\ -s_2^* \end{bmatrix}$$

$$\underline{n} = \begin{bmatrix} n_1[k] \\ n_2[k] \\ n_1^*[k+1] \\ n_2^*[k+1] \end{bmatrix}$$

$$\underline{H}_q = \begin{bmatrix} h_{11,q}[k] & h_{12,q}[k] & 0 & 0 \\ h_{21,q}[k] & h_{22,q}[k] & 0 & 0 \\ 0 & 0 & h_{11,q}^*[k+1] & h_{12,q}^*[k+1] \\ 0 & 0 & h_{21,q}^*[k+1] & h_{22,q}^*[k+1] \end{bmatrix}$$

wherein $h_{ij,q}$ are the channel coefficients between the i-th receiving antenna and the j-th transmitting antenna of the q-th of the Q interfering cells ($1 \leq q \leq Q$). Hereinafter, the channel coefficients $h_{ij}$, $h_{ij,q}$ of the channel matrix $\underline{H}_0$, $\underline{H}_q$ will be assumed as taking into account also slow attenuation effects introduced by the radio channel (e.g., path-loss and shadowing); and $\underline{s}_q$ represent the QAM symbols transmitted by the q-th interfering cell on two adjacent OFDM sub-carriers.

The receiver 200 also comprises a symbol estimator unit 210 for receiving the SFBC signal $\underline{y}=[y_1,y_2]^T$ and providing an estimate of the transmitted symbols, or symbols estimate $\underline{\hat{s}}=[\hat{s}_1,\hat{s}_2]^T$. As better discussed below, when the first switching element $SW_1$ is closed, the symbol estimator unit 210 is allowed to receive also inter-cell interference estimates indicating/estimating the inter-cell interference over the two considered adjacent sub-carriers. According to the (MMSE-IRC or MMSE) algorithms implemented in the symbol estimator unit 210, such inter-cell interference estimates may comprise a 4×4 spatial correlation matrix of inter-cell interference and of noise superimposed thereto (hereinafter, Interference-plus-Noise spatial correlation matrix, or IN spatial correlation matrix $\underline{R}_v$)—MMSE-IRC algorithm—or a value of interference-plus-noise power $\sigma_Z^2$—MMSE algorithm.

As will be best understood in the following, the symbol estimator unit 210 can be selectively switched (e.g., by the control unit CU) between Alamouti-based and MMSE/MMSE-IRC-based operation modes, i.e. it can be selectively operated, at each iteration, according to Alamouti or MMSE/MMSE-IRC algorithms.

According to Alamouti algorithm (as disclosed in the paper of S. M. Alamouti, "*A Simple Transmit Diversity Technique for Wireless Communications*"), the estimate of the symbols received at each j-th receiving antenna (hereinafter, antenna symbols estimate $\hat{s}_1^{(antj)}, \hat{s}_2^{(antj)}$) is obtained by linear combinations of the SFBC signal received on each k-th OFDM sub-carrier, i.e.:

$\hat{s}_1^{(ant1)} = h_{11}^*[k]y_1[k] + h_{12}[k+1]y_2^*[k+1]$ $\hat{s}_2^{(ant1)} = -h_{12}[k]y_1^*[k] + h_{11}^*[k+1]y_1[k+1]$ $\hat{s}_1^{(ant2)} = h_{21}^*[k]y_2[k] + h_{22}[k+1]y_2^*[k+1]$ $\hat{s}_2^{(ant2)} = -h_{22}[k]y_2^*[k] + h_{21}^*[k+1]y_2[k+1]$ whereas the symbols estimate $\underline{\hat{s}}=[\hat{s}_1,\hat{s}_2]^T$, in turn obtained by linear combinations of the antenna symbols estimate $\hat{s}_1^{(antj)}, \hat{s}_2^{(antj)}$, can be expressed as follows (assuming the radio channel over the two adjacent sub-carriers constant—i.e., $h_{ij}[k]=h_{ij}[k+1], \forall i,j$):

$\hat{s}_1 = (|h_{11}|^2 + |h_{12}|^2 + |h_{21}|^2 + |h_{22}|^2)s_1 + h_{11}^*n_1[k] + h_{12}n_1^*[k+1] + h_{21}^*n_2[k] + h_{22}n_2^*[k+1]$ $\hat{s}_2 = (|h_{11}|^2 + |h_{12}|^2 + |h_{21}|^2 + |h_{22}|^2)s_2 + h_{11}^*n_1[k+1] - h_{12}n_1^*[k] + h_{21}^*n_2[k+] + h_{22}n_2^*[k+1] - h_{22}n_2^*[k]$ Thus, according to Alamouti algorithm, full order diversity is achieved ($4^{th}$ diversity order in the case, herein considered, of a 2×2 MIMO system), and inter-cell interference is considered as uncorrelated Gaussian noise (being therefore sub-optimal in presence of correlated inter-cell interference).

Unlike the Alamouti algorithm, the MMSE and MMSE-IRC algorithms take into account the inter-cell interference over the two considered adjacent sub-carrier.

According to MMSE algorithm, the symbols estimate $\underline{\hat{s}}=[\hat{s}_1,\hat{s}_2]^T$ is calculated by taking into account thermal noise and inter-cell interference powers i.e.:

$\underline{\hat{s}} = \underline{H}_0^H \cdot [\underline{H}_0 \underline{H}_0^H + (\sigma_I^2 + \sigma_N^2)I_4]^{-1} \underline{y}$ wherein $\sigma_N^2$ and $\sigma_I^2$ are the thermal noise and inter-cell interference powers, respectively, measured/estimated over the two considered OFDM sub-carriers, and $I_4$ is a 4×4 identity matrix. The superscript $(.)^H$ in the equation above denoting the Hermitian (i.e., conjugate transpose) mathematical operation.

According to MMSE-IRC algorithm, the symbols estimate $\underline{\hat{s}}=[\hat{s}_1,\hat{s}_2]^T$ is calculated by taking into account the spatial correlation of the interference (the thermal noise being instead supposed spatially white), i.e.:

$\underline{\hat{s}} = \underline{H}_0^H \cdot [\underline{H}_0 \underline{H}_0^H + \underline{R}_I + \sigma_N^2 I_4]^{-1} \underline{y}$ wherein $\underline{R}_I$ is the 4×4 spatial correlation matrix of the inter-cell interference over the two considered k-th and (k+1)-th OFDM sub-carriers, and $$\underline{R}_Z = \underline{R}_I + \sigma_N^2 I_4$$

is the IN spatial correlation matrix $\underline{R}_Z$.

The implementation of the MMSE or MMSE-IRC algorithms (as indicated by the above expressions) requires the inversion of a 4×4 complex matrix. This operation may increase the complexity of the receiver 200 and require specific mathematic coprocessors for its execution.

In order to avoid such an event, the MMSE or MMSE-IRC algorithms are preferably implemented such that even and odd OFDM sub-carriers are considered separately.

The symbols estimate for the even OFDM sub-carriers can be indicated by the following equations (the superscript $^{(e)}$ denoting that the associated quantity is referred to the even OFDM sub-carriers):

$$\hat{\underline{s}}^{(e)} = \underline{H}_0^{(e)H} \cdot [\underline{H}_0^{(e)} \underline{H}_0^{(e)H} + (\sigma_I^2 + \sigma_N^2)I_2]^{-1} \underline{y}^{(e)} \quad \text{MMSE}$$

$$\hat{\underline{s}}^{(e)} = \underline{H}_0^{(e)H} \cdot [\underline{H}_0^{(e)} \underline{H}_0^{(e)H} + \underline{R}_I^{(e)} + \sigma_N^2 I_2]^{-1} \underline{y}^{(e)} \quad \text{MMSE-IRC}$$

wherein $$\underline{y}^{(e)} = \begin{bmatrix} y_1[k] \\ y_2[k] \end{bmatrix}$$

$$\underline{H}_0^{(e)} = \begin{bmatrix} h_{11}[k] & h_{12}[k] \\ h_{21}[k] & h_{22}[k] \end{bmatrix}$$

$$\underline{I}^{(e)} = \begin{bmatrix} I_1[k] \\ I_2[k] \end{bmatrix}$$

$$\underline{n}^{(e)} = \begin{bmatrix} n_1[k] \\ n_2[k] \end{bmatrix}$$

$\underline{R}_I^{(e)}$ is the 2×2 the spatial correlation matrix of the inter-cell interference calculated/estimated for the even OFDM sub-carriers, and $\underline{R}_I^{(e)} + \sigma_N^2 I_2$ represents the IN spatial correlation matrix $\underline{R}_Z^{(e)}$ for the even OFDM sub-carriers.

Similarly, the symbols estimate for the odd OFDM sub-carriers can be indicated by the following equations (the superscript $^{(o)}$ denoting that the associated quantity is referred to the odd OFDM sub-carriers):
wherein $$\hat{\underline{s}}^{(o)} = \underline{H}_0^{(o)H} \cdot [\underline{H}_0^{(o)} \underline{H}_0^{(o)H} + (\sigma_I^2 + \sigma_N^2)I_2]^{-1} \underline{y}^{(o)*} \quad \text{MMSE}$$

$$\hat{\underline{s}}^{(o)} = \underline{H}_0^{(o)H} \cdot [\underline{H}_0^{(o)} \underline{H}_0^{(o)H} + \underline{R}_I^{(o)*} + \sigma_N^2 I_2]^{-1} \underline{y}^{(o)*} \quad \text{MMSE-IRC}$$

$$\underline{y}^{(o)} = \begin{bmatrix} y_1^*[k+1] \\ y_2^*[k+1] \end{bmatrix}$$

$$\underline{H}_0^{(o)} = \begin{bmatrix} h_{12}^*[k+1] & -h_{11}^*[k+1] \\ h_{22}^*[k+1] & -h_{21}^*[k+1] \end{bmatrix}$$

$$\underline{I}^{(o)} = \begin{bmatrix} I_1^*[k+1] \\ I_2^*[k+1] \end{bmatrix}$$

$$\underline{n}^{(o)} = \begin{bmatrix} n_1^*[k+1] \\ n_2^*[k+1] \end{bmatrix}$$

$\underline{R}_I^{(o)}$ is the 2×2 spatial correlation matrix of the inter-cell interference calculated/estimated for the odd OFDM sub-carriers, and $\underline{R}_I^{(o)} + \sigma_N^2 I_2$ represents the IN spatial correlation matrix $\underline{R}_Z^{(o)}$ for the odd OFDM sub-carriers.

Thus, the (final) symbols estimate can be obtained by adding the symbols estimates for the even $\hat{\underline{s}}^{(e)}$ and odd $\hat{\underline{s}}^{(o)}$ OFDM sub-carriers to each other, namely:

$$\hat{\underline{s}} = \hat{\underline{s}}^{(e)} + \hat{\underline{s}}^{(o)}$$

Thus, the separate processing of the even and odd OFDM sub-carriers reduces the complexity of the general MMSE/MMSE-IRC implementation by turning the inversion of a 4×4 spatial correlation matrix to the inversion of two 2×2 covariance matrices estimated on the even and odd OFDM sub-carriers, respectively. The advantage is thus a significant reduction of the complexity with a negligible difference in terms of bit error rate performance.

The receiver 200 also comprises a soft demodulation unit 220 for receiving the symbols estimate $\hat{\underline{s}} = [\hat{s}_1, \hat{s}_2]^T$ (or, preferably, a scaled version thereof) and providing, according to well known soft demodulation operations (including symbol-to-bit de-mapping) corresponding de-mapped data $D^{220}$ (i.e., the combinations/groups of bits that, at the transmitter side, have been mapped by a proper constellation mapper before transmission). In order to improve the soft-demodulation operations, the amplitude of the symbols estimate $\hat{\underline{s}} = [\hat{s}_1, \hat{s}_2]^T$ output from the symbol estimator module 210 is preferably scaled, by multiplying it at the multiplying node 215, by a proper scaling factor $\gamma_I(n)$, before being input to the soft demodulation unit 220. Preferably, the scaling factor $\gamma_I(n)$ is optimized by simulation or experimentally, and, even more preferably, it may vary as a function of the iteration number n.

When the second switching element $SW_2$ is closed, the soft demodulation unit 220 also receives a-priori data $D^{AP}$ in order to improve/refine the de-mapping operation (see, for examples, the methods described in the paper of S. T. Brink et Al., "*Iterative Demapping and Decoding for multilevel modulations*", IEEE 1998). In order to achieve that, the de-mapped data $D^{220}$ (resulting from the application of the a-priori data $D^{AP}$ to the soft demodulation unit 220) is subtracted by the a-priori data $D^{AP}$ at the subtraction node 225, thereby obtaining refined de-mapped data $D^{220} - D^{AP}$.

The receiver 200 also comprises a rate de-matching unit 230 for performing bit de-puncturing/soft-combining, combination of H-ARQ transmissions, and/or de-interleaving operations. The rate de-matching unit 230 receives the de-mapped data $D^{220}$ (or, according to the ongoing iteration, the refined de-mapped data $D^{220} - D^{AP}$) and provides corresponding rate de-matched data $D^{230}$.

The receiver 200 also comprises a decoder unit 235 (e.g., a turbo decoder implemented by using a 8-state parallel concatenated turbo code), generally configured for receiving the rate de-matched data $D^{230}$ and providing LLR ("Log Likelihood Ratio")-based estimates of the information bits $b_1, b_2$, or soft information bits $LLR_{b1}, LLR_{b2}$, and (preferably) LLR-based estimates of redundancy bits $r_1, r_2$, or soft redundancy bits $LLR_{r1}, LLR_{r2}$ (the redundancy bits $r_1, r_2$ being used for protection of the information bits $b_1, b_2$ against errors introduced by the radio channel). Preferably, the soft redundancy bits $LLR_{r1}, LLR_{r2}$ are output together with the soft information bits $LLR_{b1}, LLR_{b2}$ by Log-MAP ("Logarithmic Maximum A Posteriori") algorithm implemented in the decoder unit 235.

The receiver 200 also comprises a hard decision unit 240 for receiving the soft information bits $LLR_{b1}, LLR_{b2}$ and extracting, in a known manner, the corresponding information bits $b_1, b_2$, and an evaluation unit 245, for receiving, at each iteration, the information bits $b_1, b_2$, evaluating errors in the received information bits $b_1, b_2$ and communicating to the control unit CU that further iterations are required/are not required based on said errors evaluation.

Preferably, errors evaluation is based on CRC ("Cyclic Redundancy Code"), which thus can be used as an early stop criterion (i.e., such that the iterations are stopped as soon as the CRC parameter indicates absence of errors). Additionally or alternatively, the number n of iterations can be set dynamically depending on operative parameters indicative of a level of the inter-cell interference. For example, CQI ("Channel Quality Indicator") parameter can be used for selection of an optimal number n of iterations.

Thanks to dynamic setting of the number n of iterations (e.g., based on the CQI parameter) and to dynamic stop of any iteration upon verifying absence of errors (e.g., based on CRC), an optimal trade-off between receiver performance and power consumption can be achieved. Indeed, the iterations (and hence the processing load lying heavy on the receiver) can be handled dynamically according to actual inter-cell interference affecting the UE 110 within the cell $105_C$. For example, as better discussed in the following, in case of users located near the node 105, the level of inter-cell interference is generally low, thus it may be sufficient to perform only one iteration using the Alamouti algorithm (or the MMSE or MMSE-IRC algorithms, properly combined with estimates of the inter-cell interference), whereas in case of users located at the cell $105_C$ edge, the level of inter-cell interference is generally high, thus inter-cell interference cancellation by two or more iterations is performed.

The receiver 200 also comprises a rate matching unit 255 for receiving the soft information $LLR_{b1}, LLR_{b2}$ and redundancy $LLR_{r1}, LLR_{r2}$ bits, and subjecting them, after recombination thereof with the rate de-matched data $D^{230}$ (preferably, as illustrated, after subtraction thereof from the soft information $LLR_{b1}, LLR_{b2}$ and redundancy $LLR_{r1}, LLR_{r2}$ bits at the subtraction node 250), to rate matching operations (i.e., puncturing/bit repetition, interleaving), and providing corresponding rate matched data $D^{255}$. As illustrated in the figure, the rate matched data $D^{255}$ are preferably scaled, by multiplying it at the multiplying node 260, by a proper scaling factor $\gamma_2(n)$, thus providing scaled rate matched data $\gamma_2(n) D^{255}$ that the soft demodulation unit 220 exploits (when the switching element $SW_2$ is closed) as a-priori data $D^{AP}$ (i.e., $D^{AP}=\gamma_2(n)D^{255}$)—however, nothing prevents from exploiting the rate matched data $D^{255}$ as a-priori data, i.e. without additional processing. Similarly to the scaling factor $\gamma_1(n)$, the scaling factor $\gamma_2(n)$ is preferably optimized by simulation or experimentally, and, even more preferably, it may vary as a function of the number n of iterations.

The receiver 200 also comprises an interference estimation unit 265 for receiving the SFBC signal $\underline{y}=[y_1,y_2]^T$, the closed, (an estimate of) the IN spatial covariance matrix $\underline{R}_z$ or of the interference-plus-noise power $\sigma_z^2$.

Two exemplarily embodiments of interference estimation units are schematically shown in FIGS. 3A and 3B (and denoted by the number references $265_A$ and $265_B$, respectively).

As visible in such figures, each interference estimation unit $265_A, 265_B$ comprises a symbols regeneration assembly for receiving the a-priori data $D^{AP}$ and providing a regenerated version of the symbol estimate $\hat{s}=[\hat{s}_1,\hat{s}_2]^T$ (hereinafter, regenerated symbols estimate $\hat{s}_R=[\hat{s}_{1R},\hat{s}_{2R}]^T$) therefrom.

According to FIG. 3A embodiment, the symbols regeneration module comprises known hard decision 305, modulation $310_A$ and SFBC encoding 315 units.

According to FIG. 3B embodiment, the symbols regeneration module comprises known soft-modulation $310_B$ and SFBC encoding 315 units (and lacking of hard decision 305, with respect to the symbols regeneration module $265_A$). Thus, the a-priori data $D^{AP}$ are directly "converted" into soft estimates of the transmitted QAM symbols.

The soft-modulation unit $310_B$ preferably comprises a QAM modulator that generates the transmitted symbols by weighting all the candidates of the considered constellation (with a more detailed description of soft-modulation module $310_B$ that can be found in the paper of G. Berardinelli et al. "*Improving SC-FDMA Performance by Turbo Equalization in UTRA LTE Uplink*", IEEE 2008, pp. 2557-2561).

For both embodiments, the regenerated symbols estimate $\hat{s}_R=[\hat{s}_{1R},\hat{s}_{2R}]^T$ (related to the symbols transmitted on the k-th and (k+1)-th OFDM sub-carriers) are then multiplied, at multiplying nodes 320-335, by the channel coefficients $h_{ij}$, and combined (i.e., added) to each other at the sum nodes 340,345, in order to provide a regenerated SFBC signal $\underline{\hat{y}}_R=[\hat{y}_{1R},\hat{y}_{2R}]^T$ free from interference-plus-noise components. Thereafter, the regenerated SFBC signal $\underline{\hat{y}}_R=[\hat{y}_{1R},\hat{y}_{2R}]^T$ is subtracted (at the subtraction nodes 350, 355) from the received SFBC signal $\underline{y}$ in order to "extract" an (estimate of) interference-plus-noise signal $z_i(k)$ for the k-th OFDM sub-carrier:

$$z[k] = \begin{bmatrix} z_1[k] \\ z_2[k] \end{bmatrix} = \underline{y}[k] - \underline{\hat{y}}[k] = \begin{bmatrix} y_1[k] \\ y_2[k] \end{bmatrix} - \begin{bmatrix} \hat{y}_1[k] \\ \hat{y}_2[k] \end{bmatrix}$$

Thus, (an estimate of) the IN spatial correlation matrix $\underline{R}_z$ can be obtained by the following formula:

$$\hat{R}_Z = E\left\{ \begin{bmatrix} z_1[k] \\ z_2[k] \\ z_1^*[k+1] \\ z_2^*[k+1] \end{bmatrix} [z_1^*[k] \quad z_2^*[k] \quad z_1[k+1] \quad z_2[k+1]] \right\}$$

$$R_Z = \begin{bmatrix} E\{|z_1(k)|^2\} & E\{z_1(k)z_2^*(k)\} & E\{z_1(k)z_1(k+1)\} & E\{z_1(k)z_2(k+1)\} \\ E\{z_1^*(k)z_2(k)\} & E\{|z_2(k)|^2\} & E\{z_1(k+1)z_2(k)\} & E\{z_2(k)z_2(k+1)\} \\ E\{z_1^*(k+1)z_1^*(k)\} & E\{z_1^*(k+1)z_2^*(k)\} & E\{|z_1(k+1)|^2\} & E\{z_1^*(k+1)z_2(k+1)\} \\ E\{z_1^*(k)z_2^*(k+1)\} & E\{z_2^*(k)z_2^*(k+1)\} & E\{z_1(k+1)z_2^*(k+1)\} & E\{|z_2(k+1)|^2\} \end{bmatrix}$$

channel matrix $\underline{H}^{(k)}$ corresponding to the k-th OFDM sub-carrier (e.g., estimated at the receiver 200 side, e.g. by means of proper pilot symbols inserted in the transmitted frames), and the a-priori data $D^{AP}$, and providing, to the symbol estimator unit 210, when the first switching element $SW_1$ is closed, (an estimate of) the IN spatial covariance matrix $\underline{R}_z$ wherein the signal $z_i(k)$ is the (estimate of) the sum between the inter-cell interference and the thermal noise signals received on the i-th UE antenna and k-th OFDM sub-carrier (in practical implementations, the statistical average operation E{·} in the equation can be replaced with suitable time averages by exploiting the ergodicity of the interfering signals).

Alternatively, as discussed above, the IN spatial correlation matrix $\underline{R}_z$ can be achieved by estimating the spatial correlation matrix on the even $\underline{R}_z^e$, and odd $\underline{R}_z^o$, sub-carriers, respectively.

The interference-plus noise power $\sigma_Z^2$ (to be fed to the estimate unit 210 when implementing the MMSE algorithm), given by the sum between the thermal noise $\sigma_N^2$ and the inter-cell interference $\sigma_I^2$ powers, can be instead obtained as follows:

$$\sigma_Z^2 = \frac{1}{2N} \sum_{i=1}^{N} (|z_1|^2 + |z_2|^2)$$

Operation of the receiver 200 according to an embodiment of the invention can be summarized as follows.

The receiver 200, upon receiving the SFBC signal $\underline{y}=[y_1,y_2]^T$, is configured for providing the information $b_1,b_2$ and redundancy $r_1,r_2$ bits carried on the SFBC signal $\underline{y}=[y_1,y_2]^T$ by execution of a number n of iterations.

First Iteration (n=1)

The switching elements $SW_1,SW_2$ are both opened. Under the control of the control unit CU, the symbol estimator unit 210 is switched to Alamouti-based operation mode. Thus, the (first) symbol estimate $\underline{\hat{s}}=[\hat{s}_1,\hat{s}_2]^T$ that, at the first iteration, is obtained according to Alamouti algorithm, is subject to symbol-to-bit de-mapping, rate de-matching and decoding operations (through the soft demodulation 220, rate de-matching 230, and decoding 235 units, respectively). The corresponding soft information $LLR_{b1},LLR_{b2}$ and redundancy $LLR_{r1},LLR_{r2}$ bits are then subject to rate matching, modulating/soft-modulating and SFBC encoding operations (through the rate matching 255, modulation $310_A$/soft-modulation $310_B$ units, respectively) thereby obtaining the regenerated SFBC signal $\underline{\hat{y}}_R=[\hat{y}_{1R},\hat{y}_{2R}]^T$ free from interference-plus-noise components and, hence, the IN spatial correlation matrix.

Second Iteration (n=2)

If the evaluation unit 245, after receiving, at the first iteration, the information bits $b_1,b_2$, evaluates that the latter are affected by (e.g., a predefined number of) errors, it communicates to the control unit CU that a second iteration is required.

Thus, under the control of the control unit CU, the switching element $SW_1$ is closed (switching element $SW_2$ still opened), and the symbol estimator unit 210 is switched to MMSE-IRC-based operation mode (or, alternatively, to MMSE-based operation mode). In this way, the symbol estimator unit 210 is allowed to receive (an estimate of) the IN spatial correlation matrix $\underline{R}_z$ (or the interference-plus-noise power $\sigma_z^2$) that is used by the MMSE-IRC algorithm (or MMSE algorithm) to provide a (second) symbol estimate $\underline{\hat{s}}=[\hat{s}_1,\hat{s}_2]^T$ (refined, i.e. more accurate, than the symbol estimate $\underline{\hat{s}}=[\hat{s}_1,\hat{s}_2]^T$ at the first iteration).

The symbol estimate $\underline{\hat{s}}=[\hat{s}_1,\hat{s}_2]^T$ that, at the second iteration, is obtained according to MMSE-IRC algorithm (and to the IN spatial correlation matrix $\underline{R}_z$) or to MMSE algorithm (and to the interference-plus-noise power $\sigma_z^2$), is subject, as before, to symbol-to-bit de-mapping, rate de-matching and decoding operations. The corresponding soft information $LLR_{b1},LLR_{b2}$ and redundancy $LLR_{r1},LLR_{r2}$ bits are then subject to rate matching, modulating/soft-modulating and SFBC encoding, thereby obtaining the regenerated SFBC signal $\underline{\hat{y}}_R=[\hat{y}_{1R},\hat{y}_{2R}]^T$ free from interference-plus-noise components and, hence, the IN spatial correlation matrix $\underline{R}_z$.

Third Iteration (n=3)

If the evaluation unit 245, after receiving, at the second iteration, the information bits $b_1,b_2$, evaluates that the latter are still affected by errors, it communicates to the control unit CU that a third iteration is required.

Thus, under the control of the control unit CU, the switching element $SW_2$ is closed (switching element $SW_1$ still closed). Upon switching element $SW_2$ closing, the corresponding soft information $LLR_{b1},LLR_{b2}$ and redundancy $LLR_{r1},LLR_{r2}$ bits (further refined by virtue of the a-priori data $D^{AP}$ received at the soft demodulation unit 220) are then subject to rate matching, modulating/soft-modulating and SFBC encoding, thereby obtaining a further refined IN spatial correlation matrix.

The symbol estimate $\underline{\hat{s}}=[\hat{s}_1,\hat{s}_2]^T$ that, at the second iteration, is obtained according to the MMSE-IRC algorithm (or the MMSE algorithm, in any case not necessarily the same of the previous iteration), is subject, as before, to symbol-to-bit de-mapping, rate de-matching and decoding operations.

Iterations Subsequent to the Third (n>3)

For each one of the iterations subsequent to the third one, the same processing discussed for third iteration is performed.

Operation of the receiver 200 according to another embodiment of the invention provides for using the MMSE-IRC algorithm even in the first iteration.

In this case, the IN spatial correlation matrix $\underline{R}_z$ has to be used since the first iteration (as the MMSE-IRC algorithm so requires).

In order to achieve that, the estimator unit 210 (or any other unit) can provide (an estimate of) the IN spatial correlation matrix $\underline{R}_z$ by exploiting only the SFBC signal $\underline{y}=[y_1,y_2]^T$. Such approach, referred to as "feed-forward" approach as opposed to approaches that are based on already available soft bits (and referred to as "feedback" approaches) basically exploits Reference Signals (RS) typically included in the SFBC signal $\underline{y}=[y_1,y_2]^T$.

For example, in the case that the UE 100 is able to estimate the channel matrix with respect to the Q interfering cells, the spatial correlation matrix $\underline{R}_I$ of the inter-cell interference can be estimated as follows (referred to the k-th OFDM sub-carrier, the sub-carrier index k that is omitted for the sake of conciseness):

$$R_I = \sum_{q=1}^{Q} H_q H_q^H$$

However, the channel matrix evaluated with respect to the signals generated by the interfering cells is difficult to estimate due to the fact that the UE 100 may not know RS sequence and position used by adjacent cells. In addition, if the interfering cells are not synchronous with respect to the serving cell, the estimation of the channel matrix may result rather complex.

An alternative to the explicit estimate of the channel matrix of the Q interfering cells is to exploit the overall received signal or the Reference Signals transmitted by the serving cell. The equations below show some "feed-forward" approaches that can be practically used for the estimate of the IN spatial correlation matrix $\underline{R}_z$:

RS-Based IN Spatial Correlation Matrix Estimate $$\underline{R}_Z = \frac{1}{N_{RS}} \sum_{RS} \underline{\tilde{y}} \underline{\tilde{y}}^H$$

wherein $\underline{\tilde{y}} = \underline{y} - \underline{H}_0 \underline{d}_0^{(RS)}$ is the interference-plus-noise signal estimated by difference in the $N_{RS}$ positions of the RS of the serving cell. In particular $\underline{y}$ is the overall SFBC received signal and $\underline{d}_0^{RS}$ is the RS symbol sequence transmitted by the serving cell (known to the UE 110). A similar approach can be also used on other reference signals defined in the LTE/LTE-Advanced standard, like for example the UE-specific RS (denoted in the LTE terminology as Demodulation RS or DM-RS).

SFBC Signal-Based IN Spatial Correlation Matrix Estimate $$\underline{R}_Z = \frac{1}{N_{RE}} \sum_{RE} \underline{y} \underline{y}^H$$

wherein $N_{RE}$ is the number of "Resource Elements" (REs) used for the estimate of the IN spatial correlation matrix.

The proposed solution is based on the closure of the feedback loops at different iterations of the procedure implemented by the receiver 200, which allows accelerating the convergence of the iterations and maximizing the gain—especially when the interference-plus-noise signal is very high compared to the SFBC signal (such as at cell edge)—and on the estimate of the spatial correlation matrix of the interference according to two distinct approaches (namely, a "feed-forward" approach that, based only on the received SFBC signal, is suitable for use at the first iteration, when the soft bits are not yet available, and a "feedback" approach, that, based on the soft bits, is suitable for use after the first iteration).

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment as a matter of general design choice.

More specifically, analogous considerations apply if the receiver has a different structure or comprises equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

In addition, although explicit reference has been made to wireless communication network based on the LTE/LTE-Advanced standard, it should be understood that it is not in the intentions of the Applicant to be limited to the implementation of any particular wireless communication system architecture or protocol.

Moreover, the solution according to an embodiment of the invention lends itself to be implemented through an equivalent method (by using similar steps, removing some steps being not essential, or adding further optional steps); moreover, the steps may be performed in different order, concurrently or in an interleaved way (at least partly).

The invention claimed is:

1. An iterative receiver for receiving in a cell a signal and for providing information carried on said signal by execution of at least one processing iteration, the receiver comprising:
   an estimate assembly for receiving the signal and providing, at each one of said processing iterations, a respective information estimate,
   a regeneration assembly for receiving, at each processing iteration, said information estimate provided by the estimate assembly at that processing iteration, for providing a regenerated signal therefrom based on said information estimate and on attenuation of radio channels over which the signal has been transmitted, and for providing rate-matched data corresponding to that processing iteration,
   an interference estimate unit for providing, at each processing iteration, an interference estimate based on the signal and the regenerated signal, the estimate assembly providing, starting from a second processing iteration after a first processing iteration of said processing iterations, said information estimate based on said interference estimate, and
   an extraction unit for extracting said information from said information estimate,
   wherein the estimate assembly comprises:
      a decoding unit for decoding said signal into a decoded signal,
      a soft-demodulation unit for receiving said decoded signal and providing demodulated data,
      a subtraction node for subtracting the rate-matched data from the demodulated data thereby obtaining combined demodulated data,
      a rate de-matching unit for receiving the combined demodulated data and providing rate de-matched data, and
      a further decoder unit for receiving the rate de-matched data and providing said information estimate.

2. The receiver according to claim 1, wherein said decoding unit is based, from said second processing iteration, on "Minimum Mean Square Error" or "Minimum Mean Square Error-Interference Rejection Combining" decoding algorithms, and wherein said interference estimate comprises a spatial correlation matrix or a power of interference-plus-noise signals affecting said signal, respectively.

3. The receiver according to claim 2, wherein the regenerating assembly comprises a rate-matching unit for performing the receiving said information estimate and the providing the rate-matched data, and wherein from a third processing iteration, the soft-demodulation unit is configured for further receiving said rate-matched data and for providing said demodulated data also based on said rate-matched data.

4. The receiver according to claim 2, wherein said decoding unit is based, at the first processing iteration, on "Minimum Mean Square Error" or "Minimum Mean Square Error-Interference Rejection Combining" decoding algorithms, the estimate assembly providing, at the first processing iteration, said information estimate based on a further interference estimate based only on said signal.

5. The receiver according to claim 2, wherein said decoding unit is based, at the first processing iteration, on Alamouti algorithm.

6. The receiver according to claim 1, wherein a number of processing iterations is set dynamically depending on operative parameters indicative of inter-cell interference.

7. The receiver according to claim 6, wherein said operative parameters comprise a "Channel Quality Indicator".

8. The receiver according to claim 1, wherein a number of processing iterations is set dynamically depending on a "Cyclic Redundancy Code" associated with said information.

9. The receiver according to claim 1, wherein the interference estimate unit comprises:
a symbols regeneration assembly for receiving the rate-matched data and providing a regenerated decoded signal, and
multiplying nodes for providing the regenerated signal by multiplying the regenerated decoded signal by channel coefficients estimating the attenuation of radio channels over which the signal has been transmitted.

10. The receiver according to claim 9, wherein the symbols regeneration assembly comprises hard decision, modulation and SFBC encoding units.

11. The receiver according to claim 9, wherein the symbols regeneration assembly comprises soft-modulation and SFBC encoding units.

12. User Equipment comprising the receiver according to claim 1.

13. A method for providing information carried on a signal received in a cell, the method comprising:
receiving the signal and providing, at each one of a number of processing iterations, a respective information estimate,
receiving, at each processing iteration, said information estimate provided by an estimate assembly at that processing iteration, providing a regenerated signal therefrom based on said information estimate and on attenuation of radio channels over which the signal has been transmitted, and providing rate-matched data corresponding to that processing iteration,
providing, at each processing iteration, an interference estimate based on the signal and the regenerated signal, the estimate assembly providing, starting from a second processing iteration after a first processing iteration of said processing iterations, said information estimate based on said interference estimate,
extracting said information from said information estimate,
decoding said signal into a decoded signal,
receiving said decoded signal and providing demodulated data,
subtracting the rate-matched data from the demodulated data thereby obtaining combined demodulated data,
receiving the combined demodulated data and providing rate de-matched data, and
receiving the rate de-matched data and providing said information estimate.

14. The method of claim 13, wherein the interference estimate comprises a spatial correlation matrix or a power of interference-plus-noise signals affecting said signal, respectively.

15. The method of claim 14, further comprising:
receiving, from a third processing iteration, said rate-matched data, and
providing said demodulated data also based on said rate-matched data.

16. The method of claim 14, further comprising:
providing, at the first processing iteration, said information estimate based on a further interference estimate based only on said signal.

17. The method of claim 13, wherein a number of processing iterations is set dynamically depending on operative parameters indicative of inter-cell interference.

18. The method of claim 17, wherein said operative parameters comprise a "Channel Quality Indicator".

19. The method of claim 13, wherein a number of processing iterations is set dynamically depending on a "Cyclic Redundancy Code" associated with said information.

20. The method of claim 13, further comprising:
receiving the rate-matched data and providing a regenerated decoded signal, and
providing the regenerated signal by multiplying the regenerated decoded signal by channel coefficients estimating the attenuation of radio channels over which the signal has been transmitted.

* * * * *